United States Patent [19]

Remboski et al.

[11] Patent Number: 5,113,828

[45] Date of Patent: May 19, 1992

[54] METHOD AND APPARATUS FOR DETERMINING COMBUSTION CONDITIONS AND FOR OPERATING AN ENGINE

[75] Inventors: Donald J. Remboski; Steven L. Plee, both of Northborough; Jialin Yang, Westboro; Robert W. Law, Acton, all of Mass.

[73] Assignee: Barrack Technology Limited, Perth, Australia

[21] Appl. No.: 485,125

[22] Filed: Feb. 26, 1990

[51] Int. Cl.5 .................. F02D 41/14; F02P 5/145; G01L 23/16

[52] U.S. Cl. .................. 123/425; 123/426; 123/435; 123/494; 73/35; 73/116

[58] Field of Search ............... 123/425, 435, 494, 426; 73/35, 116

[56] References Cited

U.S. PATENT DOCUMENTS

| | | | |
|---|---|---|---|
| 3,978,720 | 9/1976 | Ford | 73/116 |
| 4,358,952 | 11/1982 | Maurer et al. | 73/35 |
| 4,369,748 | 1/1983 | Steinke et al. | 123/425 |
| 4,381,748 | 5/1983 | Eckert et al. | 123/494 |
| 4,397,283 | 8/1983 | Komaroff et al. | 123/494 |
| 4,413,509 | 11/1983 | Moser et al. | 73/117.3 |
| 4,419,212 | 12/1983 | Dietz et al. | 204/424 |
| 4,425,788 | 1/1984 | Franke et al. | 73/35 |
| 4,437,334 | 3/1984 | Laurenz | 73/35 |
| 4,444,043 | 4/1984 | Hattori et al. | 73/35 |
| 4,444,169 | 4/1984 | Kirisawa et al. | 123/344 |
| 4,446,723 | 5/1984 | Boning et al. | 73/35 |
| 4,463,729 | 8/1984 | Bullis et al. | 123/478 |
| 4,487,184 | 12/1984 | Boning et al. | 123/425 |
| 4,492,108 | 1/1985 | Van Zanten | 73/35 |
| 4,779,455 | 10/1988 | Kuroiwa et al. | 73/116 |
| 4,919,099 | 4/1990 | Extance et al. | 123/425 |
| 4,930,478 | 6/1990 | Plee et al. | 123/425 |
| 4,940,033 | 7/1990 | Plee et al. | 123/425 |

FOREIGN PATENT DOCUMENTS

WO89/11031 11/1989 World Int. Prop. O. .......... 123/425

OTHER PUBLICATIONS

R. A. Pinnock, P. Extance and C. P. Cockshott; Combustion Sensing Using Optical Fibres; Oct. 12-15, 1988.
Donald J. Remboski, Jr., Steven L. Plee, and Jay K. Martin; An Optical Sensor for Spark-Ignition: Engine Combustion Analysis and Control; Feb. 27, 1989.
Lucas Automotive, Gasoline Engine Systems Division; Adaptive Ignition Control (date unknown).
E. Day and B. J. Mehallick; Officially Measured Engine Timing (date unknown).
M. Takata, T. Ogawa, F. Kobayashi and S. Ikeda; Development of Optical Combustion Timing Sensor for a Diesel Engine (date unknown).
Vanzetti Systems, Inc.; Combustion Process Monitor for Automobile Engines and Instrumentation Proposal, May 31, 1978.

*Primary Examiner*—Andrew M. Dolinar
*Attorney, Agent, or Firm*—Harness, Dickey & Pierce

[57] ABSTRACT

An internal combustion engine is provided having a luminosity detector and an arrangement for adjusting the parameters of the engine in response to sensed combustion conditions within the combustion chamber based on particular gain independent parameters of the luminosity signal. The gain independent luminosity parameters can also be used to obtain uniform combustion conditions from cycle to cycle in a given combustion chamber and uniform combustion in the combustion chambers of multi chamber engine.

24 Claims, 8 Drawing Sheets

METHOD AND APPARATUS FOR DETERMINING COMBUSTION CONDITIONS AND FOR OPERATING AN ENGINE

BACKGROUND OF THE INVENTION

This invention relates to a method and apparatus for operating an engine, and more particularly to an improved method and apparatus for operating an engine in response to actual conditions sensed in the combustion chamber during each combustion cycle.

With modern technology and electronics, many of the components and running conditions of an internal combustion engine can be controlled more accurately than with previous mechanical systems. For example, the control of the air/fuel ratio, spark timing, fuel injection timing and pulse, and other adjustable factors of engine operation are greatly facilitated through the use of and electronic components and electronic computers. However, in order to accurately sense the running of the engine and the various phenomena occurring within the combustion chamber during each combustion cycle, it is necessary to provide a sensor that is directly positioned within the combustion chamber or in proximity to it and which senses the actual combustion conditions in the engine. Most engine controls employ external devices such as oxygen sensors or knock sensors which actually sense only average conditions due to their inherent nature.

It has been understood that knocking can be determined by an optical sensor that operates within the combustion chamber and which senses the luminosity of the gases in that chamber. A wide variety of knock detectors have been proposed that employ such sensors. However, the inventors have discovered that luminosity in the combustion chamber and, in particular, various gain independent parameters of the luminosity signal or curve can indicate a much wider range of engine operating and running conditions than previously realized.

It is, therefore, a principal object of this invention to provide an improved apparatus and method for operating an engine wherein a luminosity detector and particular gain independent parameters of its luminosity signal or curve are used to determine certain combustion conditions occurring in the combustion chamber.

It is a further object of this invention to provide an improved system and method for operating an engine wherein the engine's adjustable parameters such as air/fuel ratio, spark timing, fuel injection, etc. can be varied in response to actual sensed conditions in the combustion chamber so as to provide better running of the engine.

A type of engine sensor has been proposed that senses the actual luminosity of the gases within the combustion chamber. A wide variety of patents illustrating and describing the use of such sensors have issued including the following U.S. Pat. Nos.:

4,358,952
4,369,748
4,377,086
4,393,687
4,409,815
4,412,446
4,413,509
4,419,212
4,422,321
4,422,323
4,425,788
4,468,949
4,444,043
4,515,132

For the most part, these patents disclose arrangements wherein the sensor is utilized to sense only total luminosity and to equate the luminosity signal to a knocking signal. However, as previously noted, the inventors have discovered that this luminosity signal and, in particular, various gain independent parameters of the luminosity signal or curve can also be employed to determine particular phenomena occurring in the combustion chamber which then provides a basis for adjusting various engine parameters and running characteristics. Thus, it is a further object of this invention to use the gain independent luminosity parameters to control the engine parameters to obtain better running and to obtain consistent running from cylinder to cylinder and cycle to cycle.

SUMMARY OF THE INVENTION

This invention is adapted to be embodied in a method for operating an internal combustion engine and an apparatus therefor that has a combustion chamber and means for forming a combustible air/fuel mixture within the combustion chamber. In accordance with this embodiment of the invention, the luminosity of the gases in the combustion chamber are sensed or detected, a curve based on the detected luminosity is generated, the characteristic of at least one gain independent parameter of the luminosity curve is determined such as location of peak luminosity derivative, preferably in relation to output shaft or crank angle, and at least one parameter of the engine is adjusted to obtain a desired characteristic for that particular gain independent luminosity parameter at at least one point on the curve, preferably in relation to output shaft or crank angle.

Another feature of the invention is also adapted to be embodied in a method for operating an internal combustion engine and an apparatus therefor having a combustion chamber and means for causing combustion to occur in the combustion chamber. In accordance with this feature of the invention, the luminosity of the gases in the combustion chamber are detected during each combustion cycle and the engine is adjusted to minimize cyclic variations.

Yet another feature of the invention is adapted to be embodied in a method and apparatus for operating a multi-combustion chamber internal combustion engine that includes means for effecting combustion in each of the combustion chambers. In accordance with this feature of the invention, the luminosity of the gases are detected in each of the combustion chambers and adjustment is made to the engine so as to minimize chamber to chamber variations for that particular combustion condition.

DETAILED DESCRIPTION OF THE PREFERRED EMBODIMENTS

Figure 1:
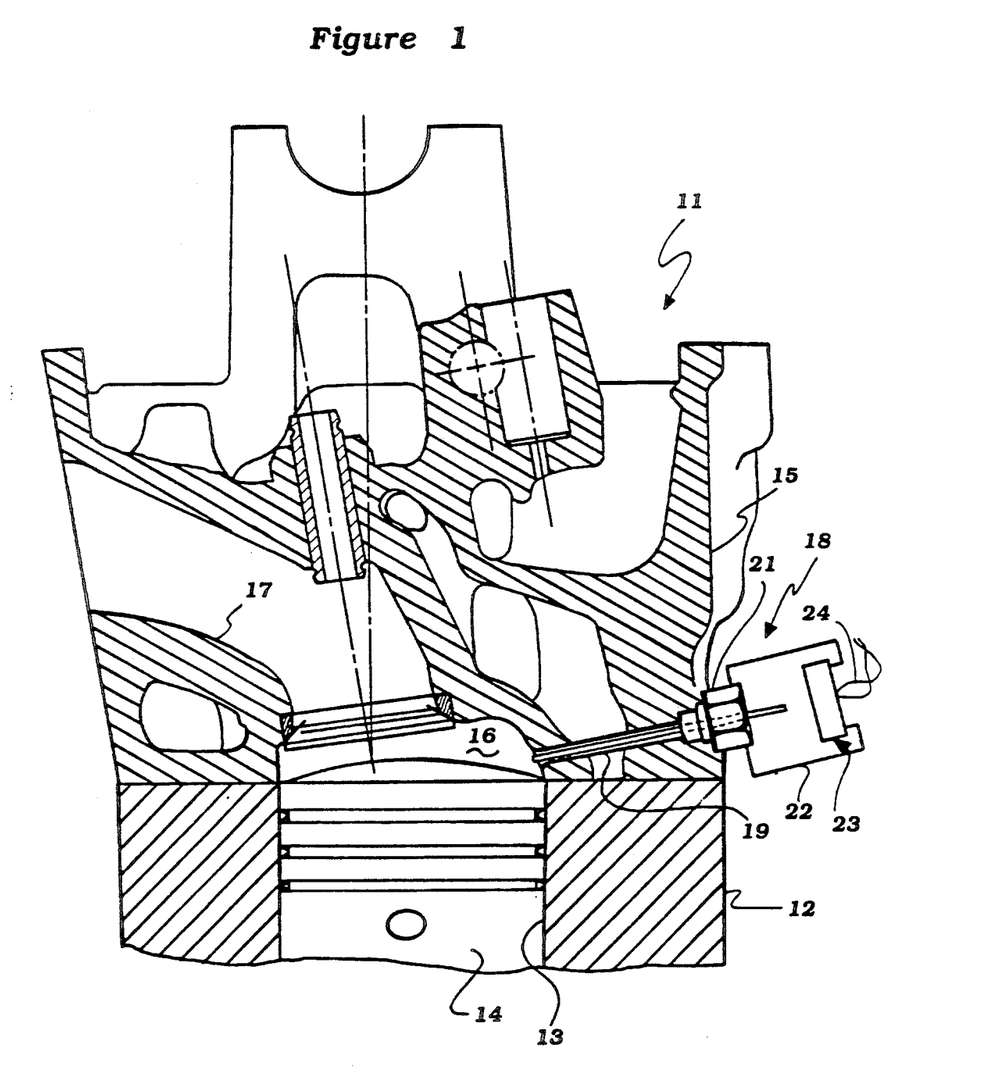
FIG. 1 illustrates a cross-sectional view taken through a single combustion chamber of a multi-cylinder internal combustion engine constructed and operated in accordance with the embodiments of the invention.

Referring to FIG. 1 of the drawings, a multi-cylinder internal combustion engine is identified generally by the reference numeral 11. It is to be understood that, although the invention has particular utility in multi-cylinder engines, certain facets of the invention may find application in single cylinder engines as well. Also, although the invention is described in conjunction with a reciprocating type engine, the principles of the engine may be utilized with engines of the non-reciprocating type, such as rotary engines, and with engines operating on either two stroke or four stroke cycles.

Inasmuch as the invention is concerned primarily with the combustion chamber and the conditions therein, only a cross-sectional view taken through one of the combustion chambers is believed to be necessary to understand the invention. This cross-sectional view shows a cylinder block 12 having a cylinder bore 13 in which a piston 14 is supported for reciprocation. The piston 14 is connected by means of a connecting rod (not shown) to a crankshaft for providing output power from the engine.

A cylinder head 15 is affixed in a known manner to the cylinder block 12 and has a recess 16 which cooperates with the cylinder bore 13 and head of the piston 14 to provide a chamber of variable volume, sometimes referred to hereinafter as the combustion chamber.

An intake port 17 and an exhaust port (not shown) extend through the cylinder head 15 and have their communication with the combustion chamber 16 controlled by poppet type intake and exhaust valves (not shown) for admitting a charge to the combustion chamber 16 and for discharging the burnt charge from the combustion chamber 16. It is to be understood, of course, that the combustion chamber 16 may have a plurality of intake and exhaust valves or may employ ports in lieu of valves and that the engine 11 may include a plurality of combustion chambers 16.

The charge admitted to the combustion chamber 16 may comprise pure air or an air/fuel mixture that is formed by a suitable charge former such as a port or throttle body type fuel injector, or carburetor. Alternatively, if pure air is delivered or injected, direct cylinder or manifold injection may be employed for delivering or injecting fuel into the combustion chamber 16 to form the air/fuel mixture. The air/fuel ratio may be controlled in a wide variety of known manners such as by means of throttle valves, fuel control valves, injector pulse width, injection duration, injection timing, injection pulse, etc. Although an important feature of the invention is the parameters under which the air/fuel ratio are controlled, the actual physical hardware for adjusting the air/fuel ratio is not part of the invention. However, in accordance with the invention, these engine parameters may be adjusted manually or automatically as part of an engine control loop so as to obtain the desired combustion characteristics, which can be a function of engine speed and/or engine load.

The engine 11 is preferably of he spark ignited type. However, the types of controls exercised and the nature of luminosity detecting or sensing may vary with different engines. In an engine 11 of the spark ignited type, a spark plug will be carried in the cylinder head 15 and have its gap exposed in the combustion chamber 16. The spark timing is controlled by a suitable mechanism which may be of any conventional type; however, the timing of the spark firing can be varied in accordance with parameters as hereinafter described.

As has been previously noted, the invention is capable of embodiments in any of a wide variety of conventional types of internal combustion engines and, for that reason, the details of the engine construction are not necessary to understand how the invention can be practiced by those skilled in the art.

However, in accordance with the invention there is provided in the combustion chamber 16, a luminosity detector, indicated generally by the reference numeral 18. The luminosity detector 18 includes a fiber optic probe 19 or other type of optical access which extends through the cylinder head 15 and has its end terminating at the combustion chamber 16. The detector 18 and fiber optic probe 19 is preferably of the type described in the application entitled "Luminosity Detector", Ser. No. 284,193, filed Dec. 14, 1988 and in the continuation-in-part application of the same title, Ser. No. 467,883, filed Jan. 22, 1990, both in the names of Donald J. Remboski et al. and assigned to the assignee of this application, the disclosures of which are incorporated herein by reference. The probe 19 can be formed from a relatively inexpensive material such as synthetic sapphire ($Al_2O_3$) or other materials having similar characteristics. A probe having a diameter of 0.06" has been found to be practical and makes it relatively easy to install in the cylinder head.

The fiber optic probe 19 is held in place by means of a compression fitting 21 and has its outer end disposed within a light sealed housing 22 in proximity to a silicon photo detector 23.

Various luminosity spectra may be detected by the probe 19 or merely a total luminosity signal may be read. It has been found that certain constituents of the glowing gases in the combustion chamber 16 glow at different spectral ranges and this may be utilized to sense the amount and condition of such components in the combustion chamber 16 during each cycle of operation.

Depending on the particular gas or gases to be detected or sensed, it may be desirable to provide a monochromator or an optical filter in front of the silicon photo detector 23 so as to select the desired wavelength of light which is being measured. For this application the probe 19 is employed to measure the overall radiant emission from products of combustion (primarily $H_2O$) in the near infrared region between 850 nm and 1000 nm. For these correlations a wavelength band centered at 927.7 nm+/−20 nm was used. The near infrared region is monitored because it is not strongly influenced by radiant emission from the walls of the combustion chamber 16, nor is it sensitive to emission from the flame surface. In addition, this particular wavelength band coincides with the peak spectral response of the silicon photo detector 23.

Figure 2:
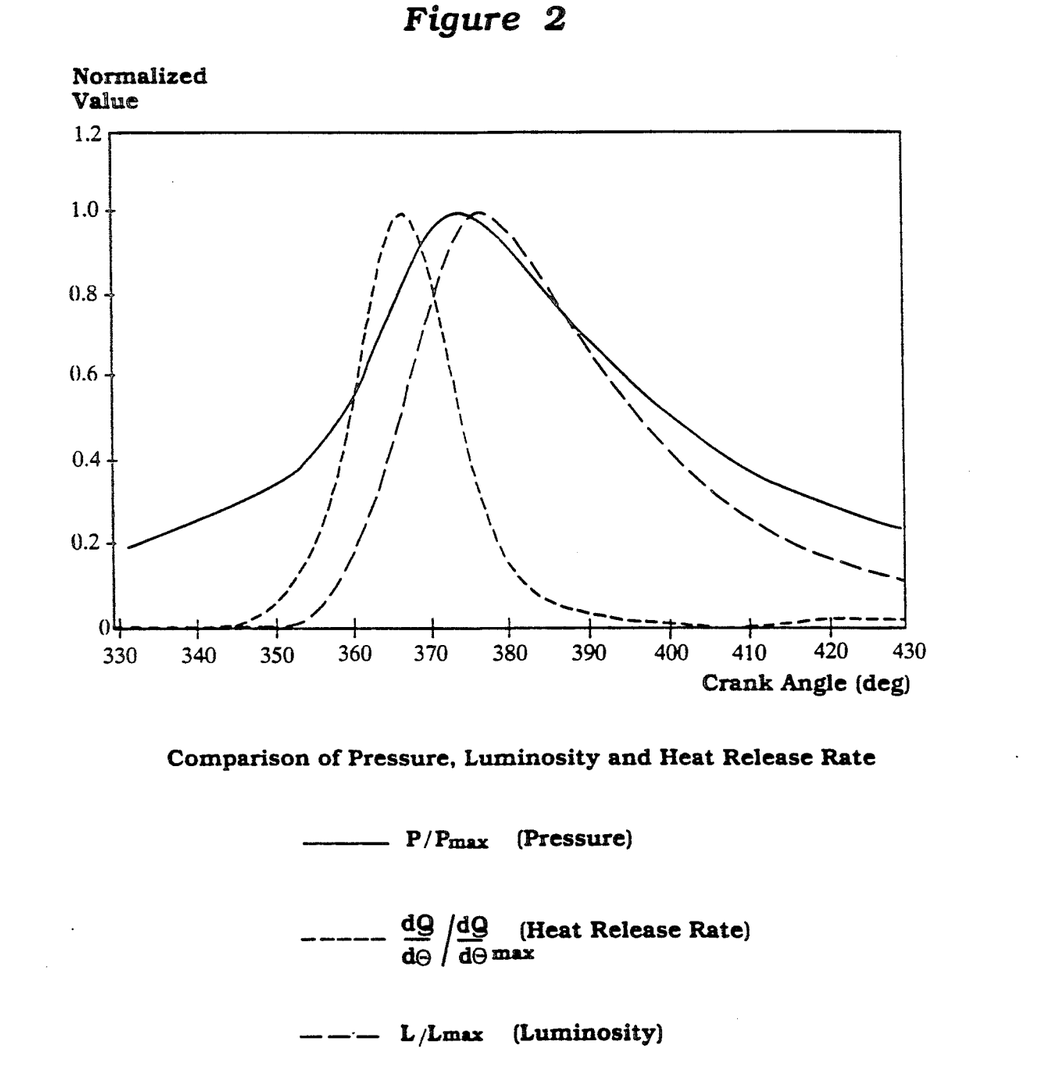
FIG. 2 shows comparison of luminosity, pressure and heat release rate as a function of crank angle.

The detector 23 is connected to a remotely positioned computer control unit by means of conductors 24. In addition to converting the voltage signal from the silicon photo detector 23 to an output indicative of luminosity, the remotely positioned control unit which may measure certain engine parameters as well, may also receive input signals from other sensors normally employed on the engine, for example, intake manifold pressure and temperature, engine speed, and spark timing angle sensors. These types of sensors are normally employed with modern internal combustion engines and their signals can be processed in conjunction with the luminosity signal to provide certain measured characteristics of the engine operation. The remotely positioned control unit may be of any suitable type and is particularly adapted to transmit the signal from the detector 23 into an output indicative of luminosity within the combustion chamber 16. A typical luminosity signal or curve as a function of crank angle is shown in FIG. 2. The measurement of the luminosity curve and the location of its various gain independent parameters in relation to crank angle assumes a reciprocating type engine. However, in non-reciprocating engines these measurements can be done in relation to output shaft angle. Accordingly, output shaft angle is used in the claims and is intended to refer to crank angle as well.

It has been discovered that a wide variety of combustion conditions and other engine characteristics can be determined by the luminosity detector 18 and the luminosity curve generated as a result of the luminosity detected in the combustion chamber 16 employed to adjust the parameters of the engine to obtain optimum performance. In addition, this luminosity curve has various parameters which are gain independent, and characteristics of these parameters have been found to provide very good indications of certain combustion conditions.

Gain independent luminosity parameters, as the name implies, are not affected by variations in the gain of the system, as are gain dependent parameters. An example of a parameter which is gain dependent is peak luminosity ($L_{max}$). The advantage associated with using gain independent parameters to determine various combustion conditions or phenomena is that the luminosity measurements are not affected when the gain of the system decreases over time due to probe deposits, etc. The inventors have discovered that the use of gain independent luminosity parameters to correlate various combustion characteristics avoids the problem of a diminishing luminosity signal over time, since gain independent correlations are not affected by variations in the gain of the system. An example of a parameter that is gain independent is the location of peak luminosity ($caL_{max}$). As long as the luminosity signal maintains a sufficient signal to noise ratio, the location of peak luminosity in crank angle degrees will remain the same regardless of gain changes. In other words, the inventors are using the shape of the luminosity curve rather than the amplitude to correlate their data.

Figure 8:
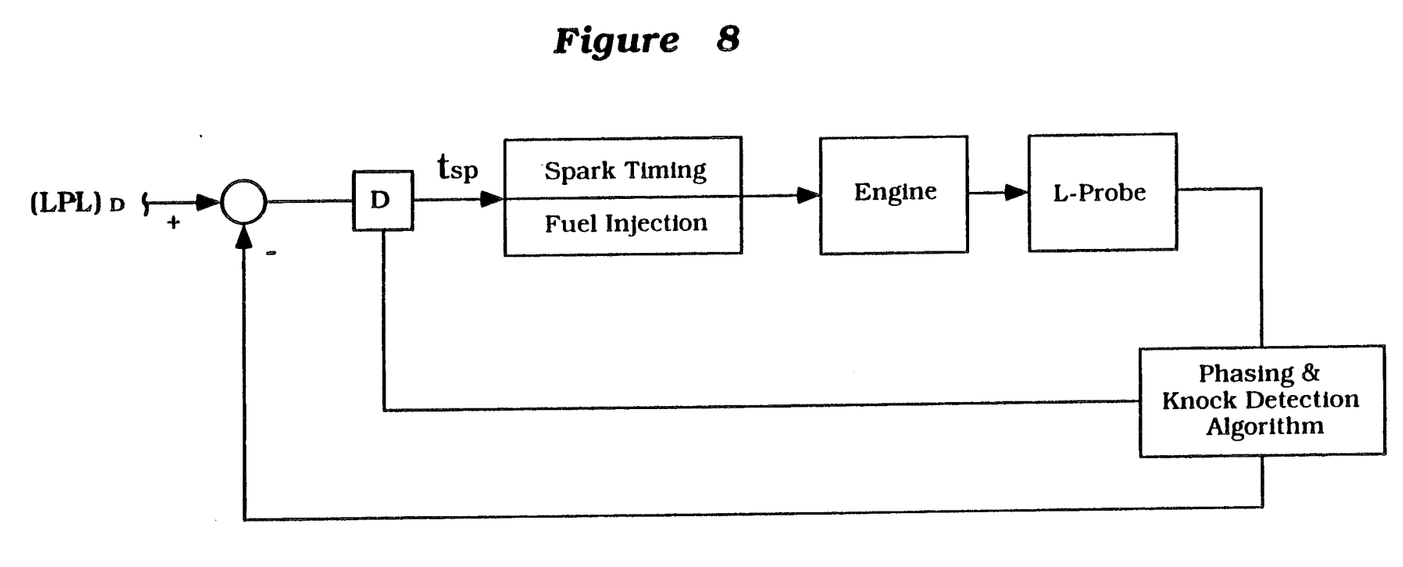
FIG. 8 shows a diagram of a spark timing control loop using the luminosity signal.

Location of peak luminosity can be used as a combustion phasing signal to control spark timing for each cylinder on a cycle-to-cycle basis under a wide variety of engine operating and running conditions. This luminosity parameter of a generated luminosity curve can be used to continually adjust spark timing and fuel injection as part of an engine control loop as shown in FIG. 8 in order to obtain the proper phasing of the luminosity curve profile. This can be accomplished by comparing the determined $caL_{max}$ from the detected luminosity with a desired $caL_{max}$ which can be a function of engine speed. The spark timing is then adjusted to obtain the desired $caL_{max}$. Knock can also be detected from the luminosity signal and is detected by a high frequency signature on the luminosity signal at detonation. This characteristic of the luminosity signal can be employed in the control loop to retard spark timing until knock is eliminated. In this case, $caL_{max}$ is used to adjust spark timing under no knock conditions.

In FIG. 8, LPL=location of peak luminosity; $LPL_D$=desired LPL; D=logic and controller algorithm (uses LPL unless knocking occurs, then retards spark timing to eliminate knock; and $t_{sp}$=spark timing command.

Data for the gain independent correlations set forth below was obtained using a single cylinder of a 2.2 liter, 4 cylinder port fuel injected, spark ignited, automotive engine of the side flow type having a compression ratio of 8.9, a bore of 87.7 mm, a stroke of 92.0 mm and two valves per cylinder. The data was also obtained under various engine speeds, intake manifold pressures, air/fuel ratios, percent EGR and spark timing.

Figure 3:
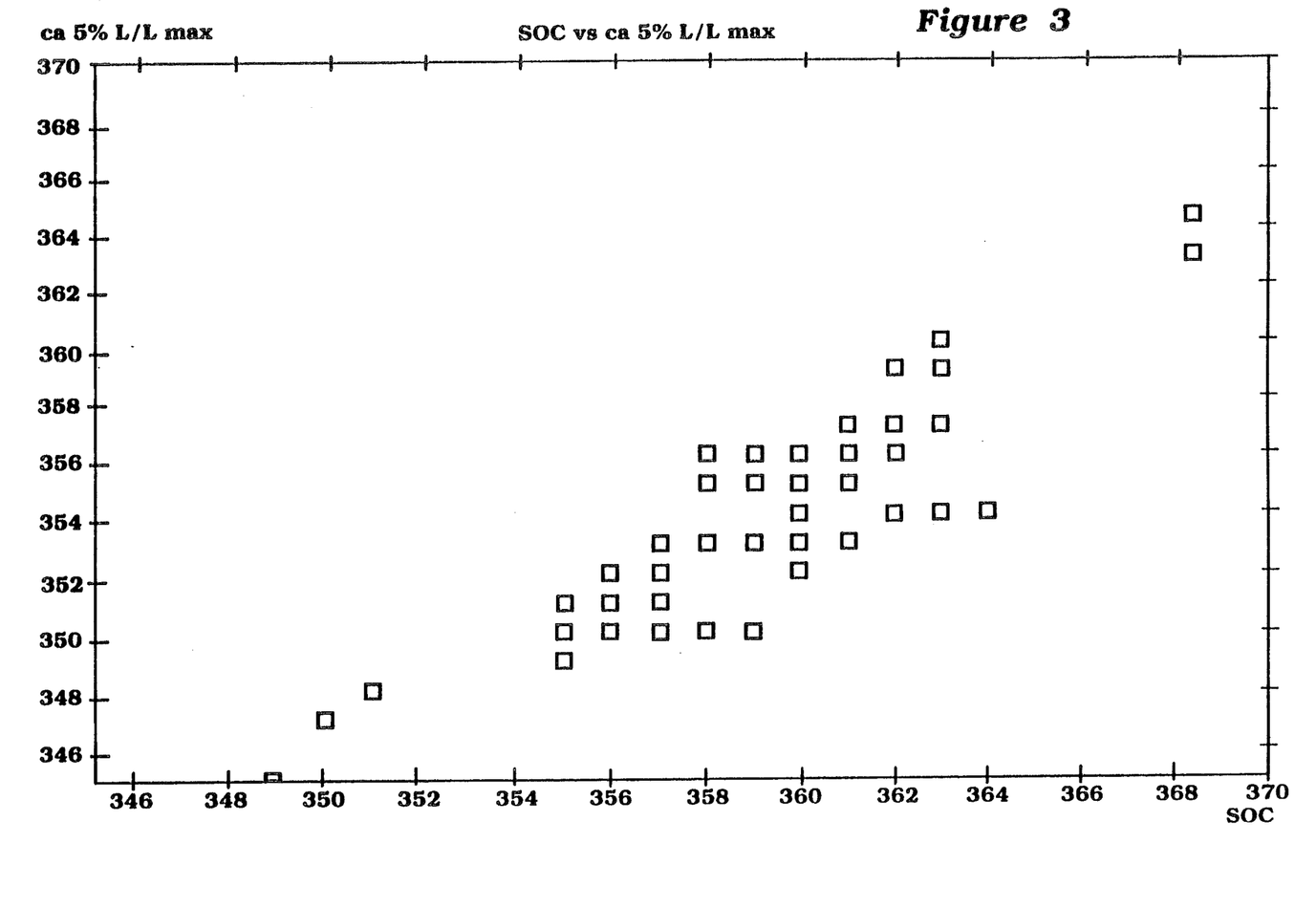
FIG. 3 shows the correlation between start of combustion (SOC) in crank angle degrees and the location at which the luminosity is 5% of the peak luminosity (ca 5% $L/L_{max}$) in crank angle degrees.
Figure 4:
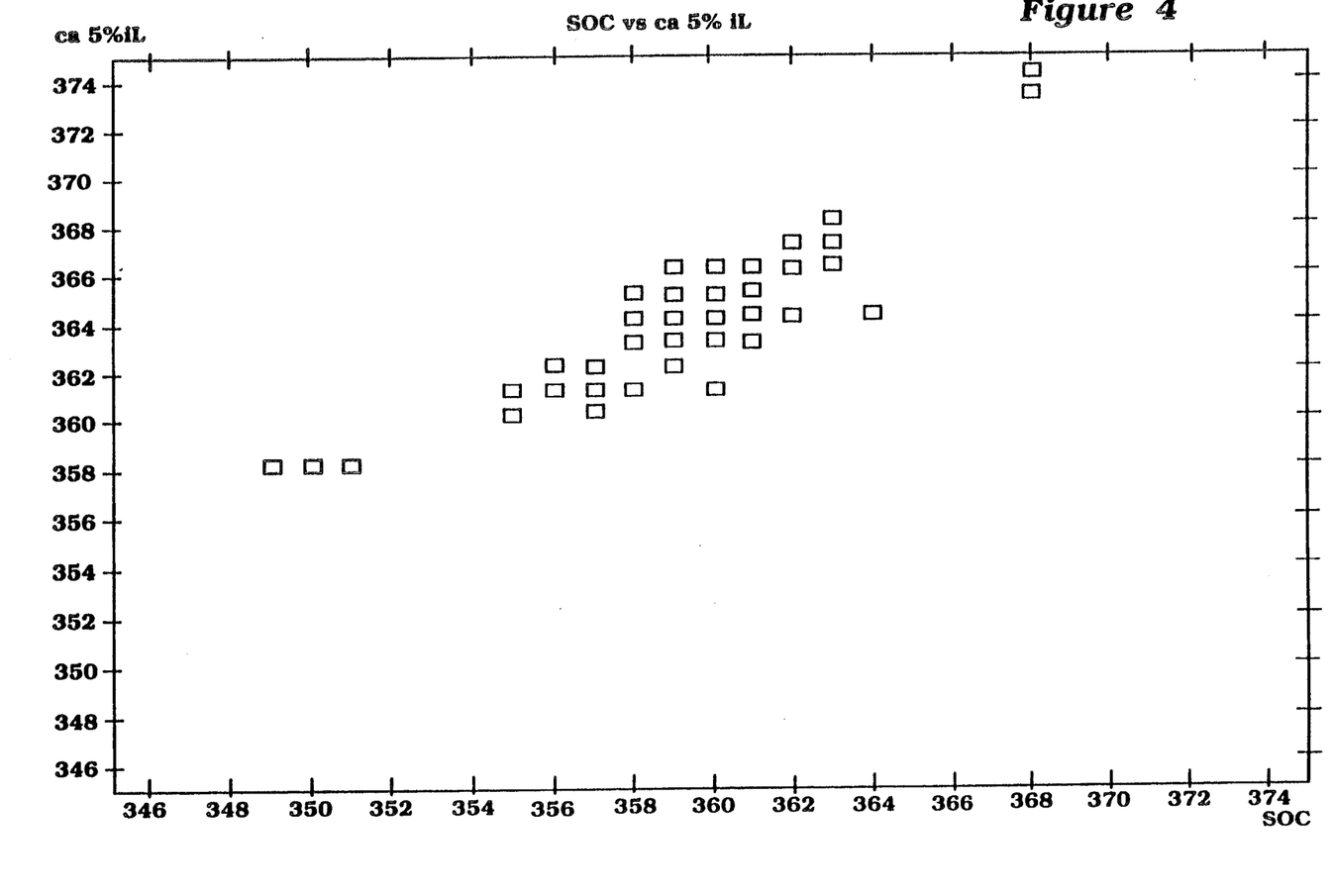
FIG. 4 shows the correlation between start of combustion (SOC) in crank angle degrees and the location at which the luminosity is 5% of the total integrated luminosity (ca 5% iL) in crank angle degrees.

The inventors have found that the characteristics of certain gain independent parameters of the luminosity curve can be used to give a good indication of start and end of combustion and combustion duration. As shown in FIG. 3, start of combustion (SOC) can be correlated to the gain independent luminosity parameter (ca 5% $L/L_{max}$) which is the location in crank angle degrees at which the luminosity is 5% of the peak luminosity. FIG. 4 shows that start of combustion can also be correlated to (ca 5%iL) which is defined as the location in crank angle degrees at which the luminosity is 5% of the total integrated luminosity. 5% of peak and total integrated luminosity is exemplary only and other percentages early in the luminosity curve can also be used for example, 1-10%.

In spark ignited, direct injected engines strong charge stratification may lead to diffusion burning and soot production. In these cases, the in-cylinder luminosity measurement is a good indicator of the presence of soot in a diffusion burn and the start of the diffusion burning. Thus, the luminosity signal may also be used to control diffusion burning in spark ignited direct fuel injection engines. By determining the degree of which diffusion burning exists, various engine parameters may be adjusted to affect a change in the burning process. For example, injection pulse width, injection timing, injection pressure, rate of fuel injection and spark timing may all be modified based on the relative degree of diffusion burning that is to be avoided, or the level of pre-mixed burning desired.

Figure 5:
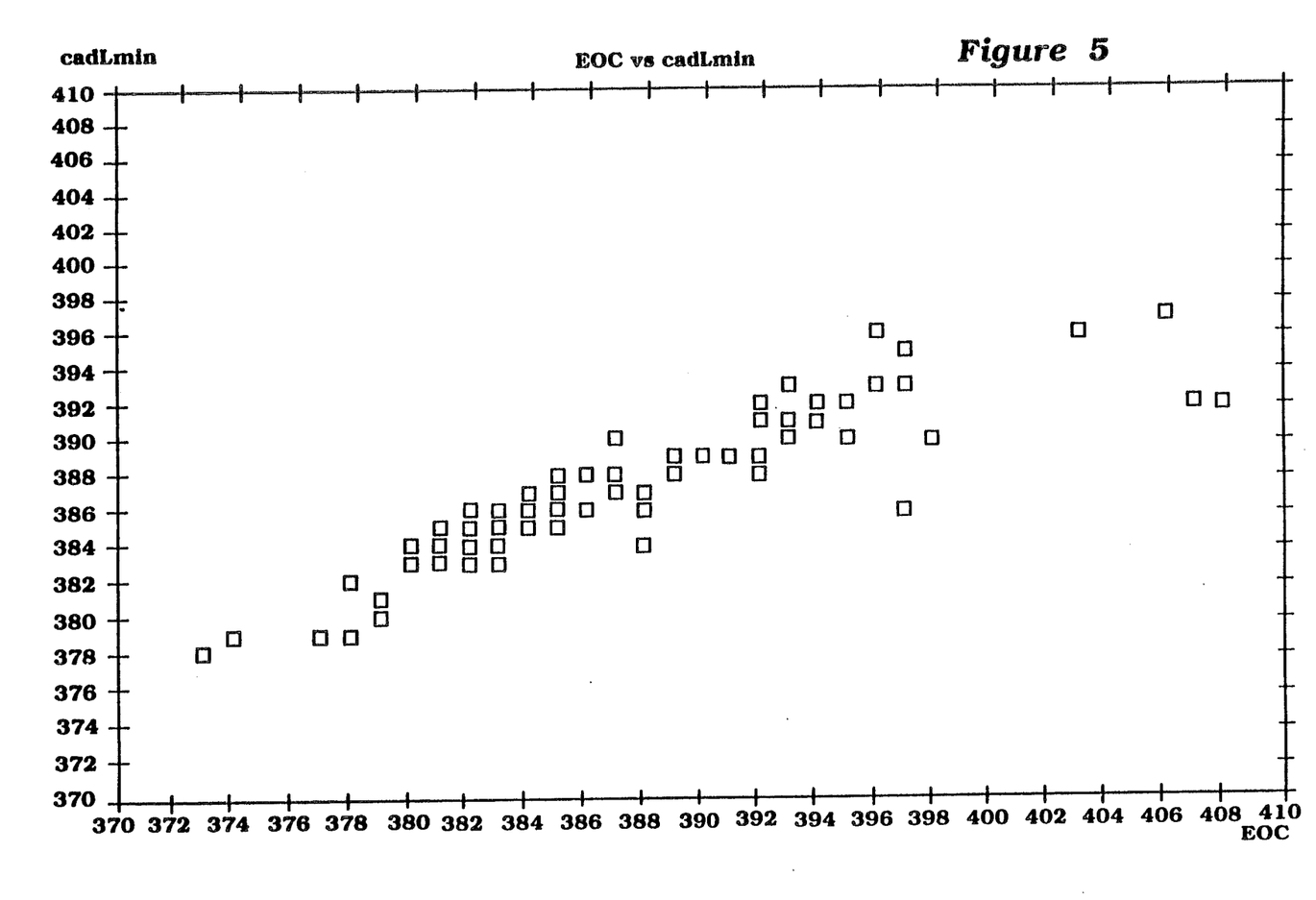
FIG. 5 depicts the correlation between end of combustion (EOC) in crank angle degrees and the location of the minimum luminosity derivative (cad$L_{min}$) in crank angle degrees.

For a "normal burn" that occurs near top dead center, the inventors have also determined that the end of combustion (EOC) can be correlated to ($cadL_{min}$) which is defined as the location of the minimum luminosity derivative in crank angle degrees. This correlation is shown in FIG. 5. That is, the end of combustion can be defined by determining the location of the minimum rate of change of luminosity in crank angle degrees. A late $cadL_{min}$ in the cycle can indicate incomplete burns, high CO emission and/or high hydrocarbon emission. Various engine parameters such as spark timing can be adjusted so that the $cadL_{min}$ occurs at the desired crank angle location so as to eliminate or minimize these undesirable effects or emissions.

Once the start and end of combustion are determined the duration of combustion in crank angle degrees can also be determined by subtracting the start of combustion measurement from the end of combustion measurement.

These gain independent luminosity parameters may then be employed to adjust or control engine parameters such as spark timing so as to control when combustion begins to obtain optimum performance characteristics. These adjustments can be made manually or automatically as part of an engine control loop to obtain better running of the engine. The control circuitry and mechanism for adjusting spark timing or other adjustable parameters of the engine in response to the luminosity parameters are believed to be within the scope of those skilled in the art once they understand that these gain independent luminosity parameters are indicative of the start and end of combustion, and also that these parameters can be used so as to control the start of combustion. Some of these luminosity parameters may also be utilized to determine the amount of fuel which has been or should be injected or delivered into the cylinder from a carburetor or port type injector so as to obtain the desired combustion duration or burn time.

Figure 6:
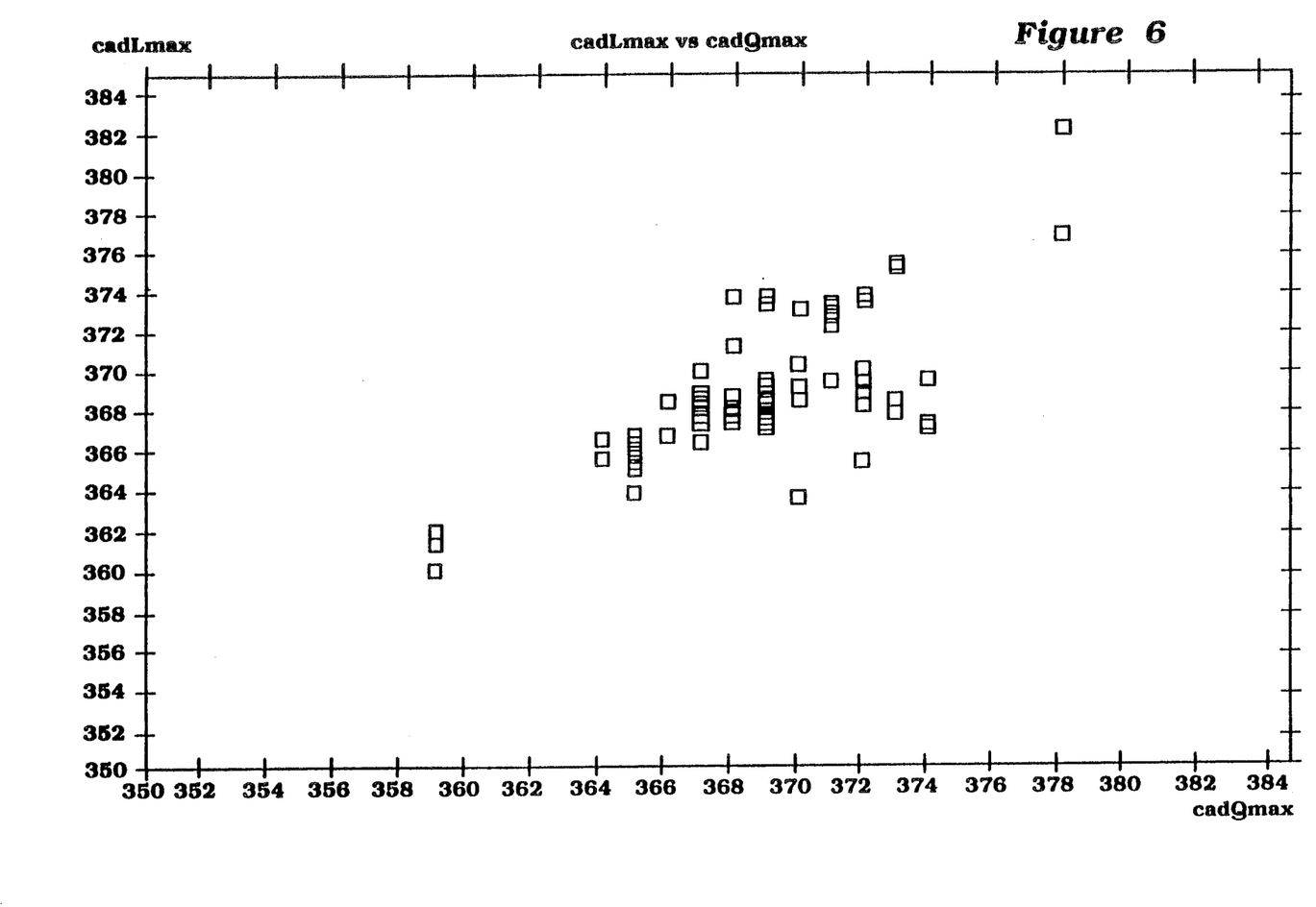
FIG. 6 illustrates the correlation between the location of peak rate of heat release (cad$Q_{max}$) in crank angle degrees and the location of the peak luminosity derivative (cad$L_{max}$) in crank angle degrees.

The inventors have also determined that for a "normal burn" that occurs near top dead center, the location in crank angle degrees of the peak rate of heat release ($cadQ_{max}$) can be determined by monitoring the location of the peak luminosity derivative in crank angle degrees ($cadL_{max}$) as shown in FIG. 6. The inventors have found that this relationship has good correlation under normal burn conditions and can be used to control burn phasing of the engine. Control of burn phasing can be accomplished by adjusting spark timing so that $cadL_{max}$ occurs at the desired crank angle location.

Figure 7:
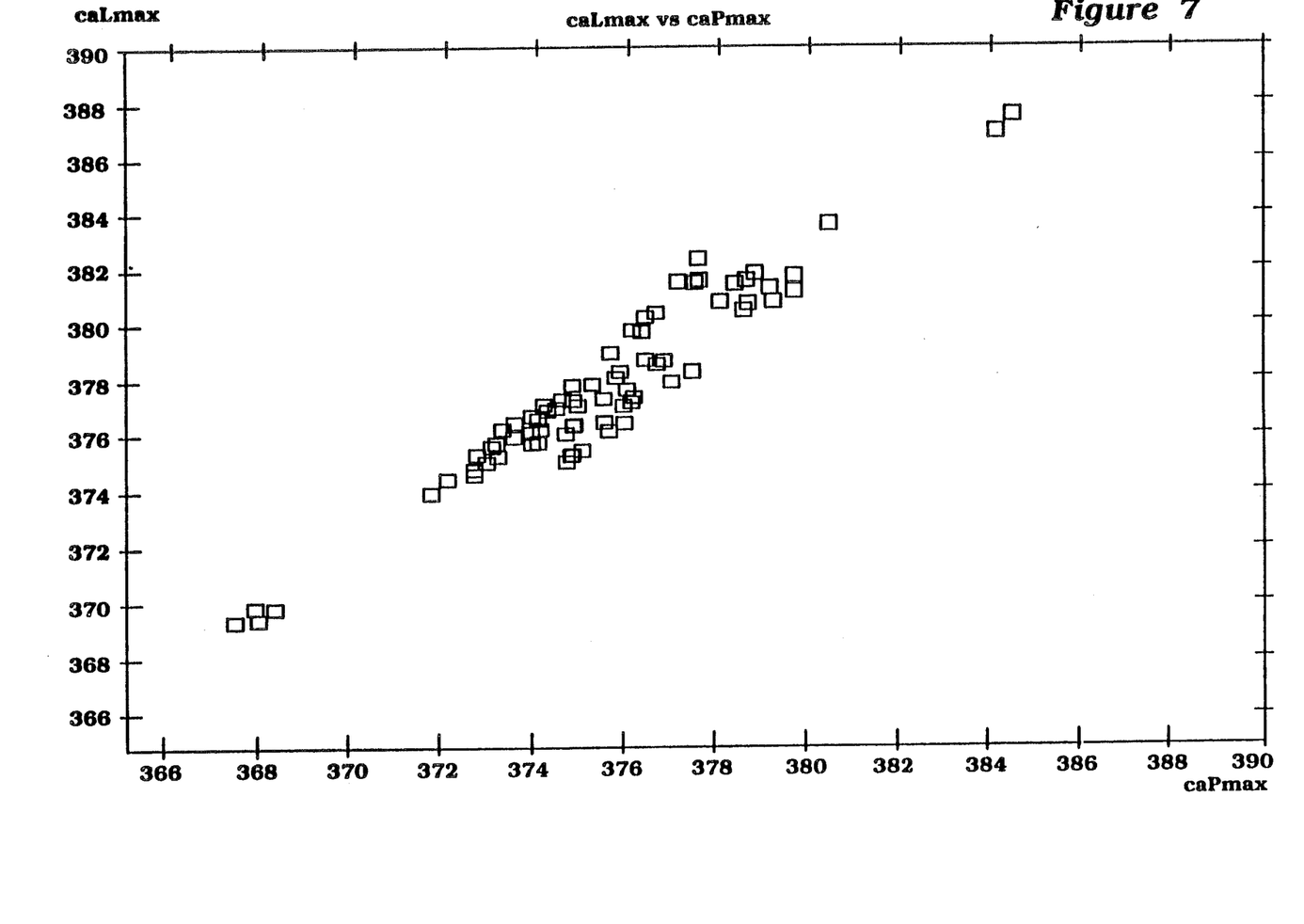
FIG. 7 shows the correlation between the location of peak pressure in the combustion chamber (ca$P_{max}$) in crank angle degrees and the location of peak luminosity (ca$L_{max}$) in crank angle degrees.

The inventors have further determined that the location of peak luminosity in crank angle degrees ($caL_{max}$) can be related to the location of peak pressure in the combustion chamber in crank angle degrees ($caP_{max}$). This correlation is shown in FIG. 7. As with the location of the peak heat release rate, location of peak pressure is a phasing parameter that can be used for spark timing control. Thus, in the "normal burn" situation the spark timing can be adjusted based on the $caL_{max}$ parameter so that parameter and the location of peak pressure occur at the desired crank angles.

It should be readily apparent that the use of luminosity signal and in particular various gain independent parameters of that signal are extremely effective in measuring numerous conditions occurring within the combustion chamber and variations from chamber to chamber and cycle to cycle. Those skilled in the art and armed with this knowledge should be able to provide the various engine controls such as the timing of the spark ignition, fuel delivery including timing and duration of fuel injection, or changing of air/fuel ratios through premixing devices such as carburetors or port injectors so as to obtain optimum performance in response to the measured combustion conditions mentioned and to minimize cycle to cycle and cylinder to cylinder variations. For example, by measuring the location of peak cylinder pressure, it is possible to phase the burning by utilizing feedback control of the spark timing to improve fuel consumption and better achieve emission control. In the same manner, the proper phasing of the burn rate using feedback control of spark timing can improve fuel consumption and provide better emission control. The control of air/fuel ratio by the feedback control of fuel flow can improve exhaust emissions and fuel consumption as well.

The foregoing description is that of preferred embodiments of the invention and various changes and modifications may be made without departing from the spirit and scope of the invention as defined by the appended claims.

We claim:

1. A method for operating an internal combustion engine having at least one combustion chamber, means for forming a combustible air/fuel mixture within the combustion chamber, means for detecting the luminosity within the combustion chamber during at least a portion of the combustion cycle, generating a curve based on the detected luminosity, determining the location at which the luminosity is a particular percentage of the peak luminosity so as to determine start of combustion.

2. A method for operating an internal combustion engine as recited in claim 1, wherein the location at which the luminosity is a particular percentage of the peak luminosity is determined in relation to output shaft angle so as to determine start of combustion.

3. A method for operating an internal combustion engine as recited in claim 2, wherein spark timing is adjusted to obtain a desired relationship between the location at which luminosity is a particular percentage of the peak luminosity and output shaft angle.

4. A method for operating an internal combustion engine as recited in claim 2, wherein at least one parameter of the engine is adjusted to obtain a desired location at which the luminosity is a particular percentage of peak luminosity in relation to output shaft angle.

5. A method for operating an internal combustion engine as recited in claim 4, wherein air/fuel ratio is adjusted.

6. A method for operating an internal combustion engine as recited in claim 4, wherein fuel delivery is adjusted.

7. A method for operating an internal combustion engine as recited in claim 1, wherein said luminosity detecting means detects the luminosity within the combustion chamber during each cycle of operation and start of combustion is determined for each cycle of operation, said method further comprising adjusting at least one parameter of the engine to obtain uniformity in each cycle of operation for start of combustion.

8. A method for operating an internal combustion engine having at least one combustion chamber, means for forming a combustible air/fuel mixture within the combustion chamber, means for detecting the luminosity within the combustion chamber during at least a portion of the combustion cycle, generating a curve based on the detected luminosity, determining the location at which the luminosity is a particular percentage of the total integrated luminosity so as to determine start of combustion.

9. A method for operating an internal combustion engine as recited in claim 8, wherein spark timing is adjusted to obtain a desired relationship between the location at which luminosity is a particular percentage of the total integrated luminosity and output shaft angle.

10. A method for operating an internal combustion engine as recited in claim 8, wherein at least one parameter of the engine is adjusted to obtain a desired location at which the luminosity is a particular percentage of the total integrated luminosity in relation to output shaft angle.

11. A method for operating an internal combustion engine as recited in claim 10, wherein air/fuel ratio is adjusted.

12. A method for operating an internal combustion engine as recited in claim 10, wherein fuel delivery is adjusted.

13. A method for operating an internal combustion engine as recited in claim 8, wherein said luminosity detecting means detects the luminosity within the combustion chamber during each cycle of operation and start of combustion is determined for each cycle of operation, said method further comprising adjusting at least one parameter of the engine to obtain uniformity in each cycle of operation for start of combustion.

14. A method for operating an internal combustion engine having at least one combustion chamber, means for forming a combustible air/fuel mixture within the combustion chamber, means for detecting the luminosity within the combustion chamber during at least a portion of the combustion cycle, generating a curve based on the detected luminosity, determining the location of the minimum luminosity derivative so as to determine end of combustion.

15. A method for operating an internal combustion engine as recited in claim 14, wherein at least one parameter of the engine is adjusted to obtain a desired location of the minimum luminosity derivative in relation to output shaft angle.

16. A method for operating an internal combustion engine as recited in claim 15, wherein air/fuel ratio is adjusted.

17. A method for operating an internal combustion engine as recited in claim 15, wherein fuel delivery is adjusted.

18. A method for operating an internal combustion engine as recited in claim 14, wherein said luminosity detecting means detects the luminosity within the combustion chamber during each cycle of operation and end of combustion is determined for each cycle of operation, said method further comprising adjusting at least one parameter of the engine to obtain uniformity in each cycle of operation for end of combustion.

19. A method for operating an internal combustion engine having at least one combustion chamber, means for forming a combustible air/fuel mixture within the combustion chamber, means for detecting the luminosity within the combustion chamber during at least a portion of the combustion cycle, generating a curve based on the detected luminosity, determining the location of the peak luminosity derivative so as to determine location of peak rate of heat release in the combustion chamber.

20. A method for operating an internal combustion engine as recited in claim 19, wherein spark timing is adjusted to obtain a desired relationship between the location of the peak luminosity derivative and output shaft angle.

21. A method for operating an internal combustion engine as recited in claim 19, wherein at least one parameter of the engine is adjusted to obtain a desired location of the peak luminosity derivative in relation to output shaft angle.

22. A method for operating an internal combustion engine as recited in claim 21, wherein air/fuel ratio is adjusted.

23. A method for operating an internal combustion engine as recited in claim 21, wherein fuel delivery is adjusted.

24. A method for operating an internal combustion engine as recited in claim 19, wherein said luminosity detecting means detects the luminosity within the combustion chamber during each cycle of operation and location of peak rate of heat release in the combustion chamber is determined for each cycle of operation, said method further comprising adjusting at least one parameter of the engine to obtain uniformity in each cycle of operation for location of peak rate of heat release in the combustion chamber.

* * * * *